US009563826B2

(12) United States Patent
Lau et al.

(10) Patent No.: US 9,563,826 B2
(45) Date of Patent: Feb. 7, 2017

(54) TECHNIQUES FOR RENDERING ADVERTISEMENTS WITH RICH MEDIA

(75) Inventors: Wai Kit Lau, Boston, MA (US); Steven Lee, Stamford, CT (US); Pete Martin, North Grafton, MA (US)

(73) Assignee: Tremor Video, Inc., New York, NY (US)

( * ) Notice: Subject to any disclaimer, the term of this patent is extended or adjusted under 35 U.S.C. 154(b) by 131 days.

(21) Appl. No.: 13/408,459

(22) Filed: Feb. 29, 2012

(65) Prior Publication Data

US 2012/0278169 A1    Nov. 1, 2012

Related U.S. Application Data

(62) Division of application No. 11/594,707, filed on Nov. 7, 2006, now abandoned.

(60) Provisional application No. 60/733,874, filed on Nov. 7, 2005, provisional application No. 60/784,415, filed on Mar. 20, 2006.

(51) Int. Cl.
G06Q 30/00    (2012.01)
G06K 9/72     (2006.01)
G06Q 30/02    (2012.01)
G10L 15/06    (2013.01)

(52) U.S. Cl.
CPC ............... G06K 9/72 (2013.01); G06Q 30/02 (2013.01); G06Q 30/0207 (2013.01); G06Q 30/0247 (2013.01); G06Q 30/0252 (2013.01); G06Q 30/0255 (2013.01); G06Q 30/0261 (2013.01); G06Q 30/0264 (2013.01); G06Q 30/0269 (2013.01); G06Q 30/0275 (2013.01); G10L 15/06 (2013.01)

(58) Field of Classification Search
CPC .................................................. G06Q 30/0251
USPC ............................................................ 705/14
See application file for complete search history.

(56) References Cited

U.S. PATENT DOCUMENTS

| 5,617,486 | A | | 4/1997 | Chow et al. |
| 5,778,340 | A | | 7/1998 | Hattori |
| 5,864,810 | A | | 1/1999 | Digalakis et al. |
| 5,951,642 | A | | 9/1999 | Onoe et al. |
| 6,134,532 | A | * | 10/2000 | Lazarus et al. ............ 705/14.25 |

(Continued)

FOREIGN PATENT DOCUMENTS

WO    WO 2006/076661    7/2006

OTHER PUBLICATIONS

Office Action for U.S. Appl. No. 12/950,160, mailed Dec. 17, 2012.

(Continued)

Primary Examiner — Matthew L Hamilton

(57) ABSTRACT

In one embodiment, an advertisement is matched to subject matter in a portion of rich media content, such as a digital video, Flash™ animation, etc. For example, during the playing of rich media content, it may be determined by audio recognition techniques that the content's subject matter matches or correlates with an advertisement. Rendering preferences associated with the advertisement are then determined. The rendering preferences may be used to determine how the advertisement should be rendered (i.e., displayed in association with the content). The advertisement is then served to a device. The advertisement is served such that it can be rendered relative to a time that the portion of media is being displayed on the device.

14 Claims, 8 Drawing Sheets

(56) References Cited

U.S. PATENT DOCUMENTS

| | | |
|---|---|---|
| 6,202,087 B1 | 3/2001 | Gadish |
| 6,208,720 B1 | 3/2001 | Curtis et al. |
| 6,223,159 B1 | 4/2001 | Ishii |
| 6,285,999 B1 | 9/2001 | Page |
| 6,343,267 B1 | 1/2002 | Kuhn et al. |
| 6,389,377 B1 | 5/2002 | Pineda et al. |
| 6,505,169 B1 | 1/2003 | Bhagavath et al. |
| 6,560,578 B2 | 5/2003 | Eldering et al. |
| 6,636,247 B1 | 10/2003 | Hamzy et al. |
| 6,704,930 B1 | 3/2004 | Eldering et al. |
| 6,879,956 B1 | 4/2005 | Honda et al. |
| 6,907,566 B1 | 6/2005 | McElfresh et al. |
| 6,944,585 B1 | 9/2005 | Pawson |
| 6,952,419 B1 | 10/2005 | Cassiday et al. |
| 7,065,488 B2 | 6/2006 | Yajima et al. |
| 7,117,439 B2 | 10/2006 | Barrett et al. |
| 7,136,875 B2 | 11/2006 | Anderson et al. |
| 7,356,590 B2 | 4/2008 | Wilson et al. |
| 7,813,954 B1 | 10/2010 | Price et al. |
| 7,822,636 B1 | 10/2010 | Ferber et al. |
| 8,108,895 B2 * | 1/2012 | Anderson ............... G06Q 30/02 705/14.4 |
| 8,135,803 B2 | 3/2012 | Whittaker et al. |
| 8,301,497 B2 | 10/2012 | Amini et al. |
| 8,577,996 B2 | 11/2013 | Hughes et al. |
| 8,615,430 B2 | 12/2013 | Yonezaki et al. |
| 2001/0042249 A1 | 11/2001 | Knepper et al. |
| 2001/0049824 A1 | 12/2001 | Baker et al. |
| 2002/0032904 A1 | 3/2002 | Lerner |
| 2002/0049635 A1 * | 4/2002 | Mai et al. ................ 705/14 |
| 2002/0059604 A1 | 5/2002 | Papagan et al. |
| 2002/0068525 A1 | 6/2002 | Brown et al. |
| 2002/0082941 A1 | 6/2002 | Bird |
| 2002/0087980 A1 | 7/2002 | Eldering et al. |
| 2002/0144261 A1 | 10/2002 | Schwalb et al. |
| 2002/0154163 A1 | 10/2002 | Melchner |
| 2002/0174425 A1 | 11/2002 | Markel et al. |
| 2003/0050863 A1 | 3/2003 | Radwin |
| 2003/0055729 A1 | 3/2003 | Bezos et al. |
| 2003/0061566 A1 | 3/2003 | Rubstein et al. |
| 2003/0070167 A1 | 4/2003 | Holtz et al. |
| 2003/0076347 A1 | 4/2003 | Barrett et al. |
| 2003/0079226 A1 | 4/2003 | Barrett |
| 2003/0101230 A1 | 5/2003 | Benschoter et al. |
| 2003/0121046 A1 | 6/2003 | Roy et al. |
| 2003/0142670 A1 | 7/2003 | Gould et al. |
| 2003/0174837 A1 | 9/2003 | Candelore et al. |
| 2003/0191760 A1 * | 10/2003 | Cameron et al. .................. 707/5 |
| 2003/0206720 A1 | 11/2003 | Abecassis |
| 2003/0220791 A1 | 11/2003 | Toyama |
| 2004/0001081 A1 | 1/2004 | Marsh |
| 2004/0003397 A1 | 1/2004 | Boston et al. |
| 2004/0051812 A1 | 3/2004 | Hayward |
| 2004/0059708 A1 | 3/2004 | Dean |
| 2004/0059712 A1 | 3/2004 | Dean et al. |
| 2004/0093327 A1 | 5/2004 | Anderson et al. |
| 2004/0143844 A1 * | 7/2004 | Brant et al. ..................... 725/42 |
| 2004/0172267 A1 | 9/2004 | Patel et al. |
| 2004/0204983 A1 | 10/2004 | Shen et al. |
| 2004/0267806 A1 * | 12/2004 | Lester ..................... 707/103 R |
| 2005/0021403 A1 | 1/2005 | Ozer et al. |
| 2005/0027821 A1 * | 2/2005 | Alexander ............ G06Q 30/02 709/218 |
| 2005/0076357 A1 | 4/2005 | Fenne |
| 2005/0102375 A1 | 5/2005 | Varghese |
| 2005/0114198 A1 | 5/2005 | Koningstein et al. |
| 2005/0137958 A1 | 6/2005 | Huber et al. |
| 2005/0149396 A1 | 7/2005 | Horowitz et al. |
| 2005/0182626 A1 | 8/2005 | Kim et al. |
| 2005/0190973 A1 | 9/2005 | Kristensson et al. |
| 2005/0192802 A1 | 9/2005 | Robinson et al. |
| 2005/0210145 A1 | 9/2005 | Kim et al. |
| 2005/0246348 A1 | 11/2005 | Hijikata et al. |
| 2006/0026628 A1 | 2/2006 | Wan et al. |
| 2006/0058999 A1 | 3/2006 | Barker et al. |
| 2006/0063587 A1 | 3/2006 | Manzo |
| 2006/0074753 A1 | 4/2006 | Schuh et al. |
| 2006/0080171 A1 | 4/2006 | Jardins et al. |
| 2006/0116924 A1 | 6/2006 | Angles et al. |
| 2006/0135232 A1 | 6/2006 | Willis |
| 2006/0156326 A1 * | 7/2006 | Goronzy et al. ................ 725/13 |
| 2006/0161553 A1 | 7/2006 | Woo |
| 2006/0167749 A1 | 7/2006 | Pitkow et al. |
| 2006/0167820 A1 | 7/2006 | Jeong et al. |
| 2006/0212350 A1 | 9/2006 | Ellis et al. |
| 2006/0212353 A1 * | 9/2006 | Roslov et al. .................. 705/14 |
| 2006/0212897 A1 * | 9/2006 | Li et al. ........................ 725/32 |
| 2006/0224444 A1 | 10/2006 | Koningstein et al. |
| 2006/0224448 A1 | 10/2006 | Herf |
| 2006/0242016 A1 | 10/2006 | Chenard |
| 2006/0259473 A1 * | 11/2006 | Li et al. ............................ 707/3 |
| 2007/0055986 A1 | 3/2007 | Gilley et al. |
| 2007/0067215 A1 | 3/2007 | Agarwal et al. |
| 2007/0078707 A1 | 4/2007 | Axe et al. |
| 2007/0094363 A1 | 4/2007 | Yruski et al. |
| 2007/0101387 A1 | 5/2007 | Hua et al. |
| 2007/0112567 A1 | 5/2007 | Lau et al. |
| 2007/0112630 A1 | 5/2007 | Lau et al. |
| 2007/0184820 A1 | 8/2007 | Marshall |
| 2007/0219984 A1 | 9/2007 | Aravamudan et al. |
| 2007/0300258 A1 | 12/2007 | O'Connor et al. |
| 2008/0010339 A1 | 1/2008 | Shin et al. |
| 2008/0010654 A1 | 1/2008 | Barrett et al. |
| 2008/0045336 A1 | 2/2008 | Stelzer et al. |
| 2008/0046562 A1 | 2/2008 | Butler |
| 2008/0059312 A1 | 3/2008 | Gern et al. |
| 2008/0066107 A1 | 3/2008 | Moonka et al. |
| 2008/0082402 A1 | 4/2008 | Turrentine |
| 2008/0098301 A1 | 4/2008 | Black et al. |
| 2008/0109300 A1 | 5/2008 | Bason |
| 2008/0109391 A1 | 5/2008 | Chan |
| 2008/0114875 A1 | 5/2008 | Anastas et al. |
| 2008/0133475 A1 | 6/2008 | Fischer |
| 2008/0170110 A1 | 7/2008 | Chan |
| 2008/0178234 A1 | 7/2008 | Eyal et al. |
| 2008/0183555 A1 | 7/2008 | Walk |
| 2008/0228576 A1 | 9/2008 | Yonezaki |
| 2008/0228581 A1 | 9/2008 | Yonezaki et al. |
| 2008/0288973 A1 | 11/2008 | Carson et al. |
| 2008/0300989 A1 | 12/2008 | Coker et al. |
| 2008/0307454 A1 | 12/2008 | Ahanger et al. |
| 2008/0319827 A1 | 12/2008 | Yee et al. |
| 2008/0319850 A1 | 12/2008 | Shaul et al. |
| 2008/0320531 A1 | 12/2008 | Kim et al. |
| 2009/0007172 A1 | 1/2009 | Ahanger et al. |
| 2009/0013347 A1 | 1/2009 | Ahanger et al. |
| 2009/0019488 A1 | 1/2009 | Ruiz-Velasco et al. |
| 2009/0077033 A1 | 3/2009 | McGary et al. |
| 2009/0083417 A1 | 3/2009 | Hughes et al. |
| 2009/0089830 A1 | 4/2009 | Chandratillake et al. |
| 2009/0094520 A1 | 4/2009 | Kulas |
| 2009/0119169 A1 | 5/2009 | Chandratillake et al. |
| 2009/0132355 A1 * | 5/2009 | Begeja et al. .................. 705/14 |
| 2009/0171728 A1 | 7/2009 | Yan et al. |
| 2009/0172727 A1 * | 7/2009 | Baluja et al. ................... 725/34 |
| 2009/0187480 A1 | 7/2009 | Bernard et al. |
| 2009/0259551 A1 | 10/2009 | Chenard et al. |
| 2009/0259552 A1 | 10/2009 | Chenard et al. |
| 2009/0326947 A1 * | 12/2009 | Arnold et al. ................. 704/257 |
| 2010/0011020 A1 | 1/2010 | Bouzid et al. |
| 2010/0023960 A1 | 1/2010 | Hasson |
| 2010/0049613 A1 | 2/2010 | Angles et al. |
| 2010/0057576 A1 | 3/2010 | Brodersen et al. |
| 2010/0114696 A1 | 5/2010 | Yang |
| 2010/0121776 A1 | 5/2010 | Stenger |
| 2010/0191680 A1 | 7/2010 | Lee et al. |
| 2011/0010231 A1 * | 1/2011 | Price et al. ................. 705/14.14 |
| 2011/0029666 A1 | 2/2011 | Lopatecki et al. |
| 2011/0078018 A1 | 3/2011 | Chunilal |
| 2011/0093783 A1 | 4/2011 | Parra |
| 2011/0125573 A1 | 5/2011 | Yonezaki et al. |
| 2011/0225608 A1 | 9/2011 | Lopatecki et al. |

(56) References Cited

U.S. PATENT DOCUMENTS

2011/0295716 A1 12/2011 Dumon et al.
2012/0203598 A1 8/2012 Patterson
2013/0145388 A1* 6/2013 Girouard et al. ............... 725/14

OTHER PUBLICATIONS

Office Action for U.S. Appl. No. 12/047,169, mailed Oct. 22, 2010.
International Search Report and written Opinion for International Application No. PCT/US2008/056799, mailed Jun. 24, 2008.
Office Action for U.S. Appl. No. 11/594,707, mailed Mar. 18, 2010.
Final Office Action for U.S. Appl. No. 11/594,707, mailed Jul. 15, 2009.
Office Action for U.S. Appl. No. 11/594,707, mailed Jul. 23, 2008.
Office Action for U.S. Appl. No. 11/594,707, mailed Sep. 9, 2010.
Office Action for U.S. Appl. No. 11/594,707, mailed Aug. 31, 2011.
International Search Report and Written Opinion for International Application No. PCT/US2006/043475, mailed Jul. 3, 2008.
Office Action for U.S. Appl. No. 11/594,714, mailed Aug. 18, 2010.
Office Action for U.S. Appl. No. 11/594,714, mailed Feb. 23, 2010.
International Search Report and Written Opinion for International Application No. PCT/US2007/083806, mailed May 16, 2008.
Office Action for U.S. Appl. No. 11/594,717, mailed Sep. 25, 2008.
International Search Report and Written Opinion for International Application No. PCT/US2006/043292, mailed Oct. 19, 2007.
Office Action for U.S. Appl. No. 11/943,357, mailed Nov. 10, 2010.
International Search Report and Written Opinion for International Application No. PCT/US2007/086821, mailed Apr. 23, 2008.
Chorianopoulos et al., "Affective Usability Evaluation for an Interactive Music Televisiion Channel," ACM Computers in Entertainment, vol. 2, No. 3, Jul. 2004, Article 7B [retrieved Apr. 24, 2008] Retrieved from the Internet. <URL:http://www.dmst.aueb.gr/dds/pubs/jrnl/2004-CIE-VC/html/CS04b.pdf >.
Google definitions of "Rich Media" generated Mar. 2, 2010.
Hanjalic, A. et al, "Affective video content representation and modeling," IEEE Transactions on Multimedia, 7(1):143-154 (2005).
Mishne, G. "Experiments with mood classification in blog posts," Informatics Institute, University of Amsterdam (2005).
Miiialcea, R. et al., "A corpus-based approach to finding happiness," AAAI Spring Symposium, pp. 1-6 (2006).
Mihalcea, R. et al., "Learning to laugh (automatically): computational models for humor recognition," 22(2):126-142 (2006).
Young et al., "The HTK book," Hidden markov model toolkit user manual, Microsoft (2000).
Office Action for U.S. Appl. No. 12/047,169, mailed Apr. 21, 2011.
Office Action for U.S. Appl. No. 11/594,714, mailed Apr. 4, 2011.
Office Action for U.S. Appl. No. 11/594,714, mailed Oct. 20, 2011.
International Search Report and Written Opinion for International Application No. PCT/US2010/057408, mailed Apr. 16, 2012.
Mishne, G. et al., "Language model mixtures for contextual ad placement in personal blogs," LNAI, 4139:435-446 (2006).
Office Action for U.S. Appl. No. 12/047,169, mailed Dec. 5, 2013.
Supplementary European Search Report for European Application No. EP06837147.5, mailed Jul. 7, 2010.
Flanagan, D., "JavaScript: The Definitive Guide, 5th Edition," Aug. 17, 2006, O'Reilly Media, pp. 271-272 and 536-538.
Office Action for U.S. Appl. No. 12/047,169, mailed Jul. 24, 2014.
Office Action for U.S. Appl. No. 12/047,169, mailed Mar. 18, 2105.

* cited by examiner right. but, the big news yesteday was [um] verizon finally finally finally announced the official availability of the razr v. three c, yes the long awaited c. d. m. a. razr. we've been hearing about this forever. yes, since c. t. i. a. earlier this year. oh jesus. yeah it's been it's been a long time. [uh] so why don't you run down the specs on this one for us. well, it does have e. v. d. o., which is the, of course, what everybody really likes. yeah, and that's a big step up over the v three. right. which only has g. p. r. s. [um] this has a one point three (megapixel camera => megabyte diskdrive).

| | razr | e.v.d.o. | g.p.r.s. | megabyte diskdrive |
|---|---|---|---|---|
| Rec engine lattice prob | 98/97 | 95 | 93 | 32 |
| Match concentration | 20/20 | 10 | 10 | 10 |
| Match position | 100/50 | 100 | 100 | 100 |
| Ad past performance | - | - | - | - |
| Ad cost/price | - | - | - | - |
| Total | 208/167 | 205 | 203 | 142 |

*Fig. 8*

TECHNIQUES FOR RENDERING ADVERTISEMENTS WITH RICH MEDIA

CROSS REFERENCES TO RELATED APPLICATIONS

This application is a divisional of U.S. patent application Ser. No. 11/594,707, entitled "Techniques For Rendering Advertisements with Rich Media," filed Nov. 7, 2006, which claims priority from U.S. Provisional Patent Applications No. 60/773,874, entitled "Method and System for Contextually Matching Advertisements with Rich Media Content", filed Nov. 7, 2005 and U.S. Provisional Patent Application No. 60/784,415 entitled "Method and System for Contextually Matching Advertisements with Rich Media Content", filed Mar. 20, 2006, each of which is incorporated herein by reference in its entirety.

BACKGROUND

Embodiments of the present invention generally relate to digital media and more specifically to displaying advertisements with rich media content.

A user can perform a text search for content using a search engine. When the search is matched to text content, the results are displayed on a web page. The search results are typically static. For example, if a user was searching for certain web pages, the web pages and URLs would be listed on the page and do not change.

Advertisements related to the content may then be placed in certain sections of the page. Because the content on the page is static, the advertisements are matched to the search once. The placement of the advertisement on the page may be optimized, such as placing the advertisements at the beginning of the results. However, because the content on the web page is static, there is no need to match the advertisements to content that changes over a period of time. It is assumed that once the search is finished, the content remains the same.

SUMMARY

Embodiments of the present invention generally relate to serving advertisements with rich media content.

In one embodiment, an advertisement is matched to subject matter in a portion of rich media content, such as a digital video, Flash™ animation, etc. For example, during the playing of rich media content, it may be determined by audio recognition techniques that the content's subject matter matches or correlates with an advertisement. Rendering preferences associated with the advertisement are then determined. The rendering preferences may be used to determine how the advertisement should be rendered (i.e., displayed in association with the content).

The advertisement is then served to a device. The advertisement is served such that it can be rendered relative to a time that the portion of media is being displayed on the device. For example, the advertisement may be rendered on the device according to an advertising plan paid for a by a sponsor. The advertising plan can include criteria for matching the advertisement to the content, a manner of displaying the ad (size, position, ad content, ad animation, etc.), or other factors. In one embodiment, the advertisement may be displayed serially with the portion of rich media content, in parallel with the portion of rich media content, injected into the rich media content, etc.

A further understanding of the nature and the advantages of the inventions disclosed herein may be realized by reference of the remaining portions of the specification and the attached drawings.

BRIEF DESCRIPTION OF THE DRAWINGS

FIG. 8 shows an example of the scoring system according to one embodiment.

DETAILED DESCRIPTION OF EXAMPLE EMBODIMENTS

System

Figure 1:
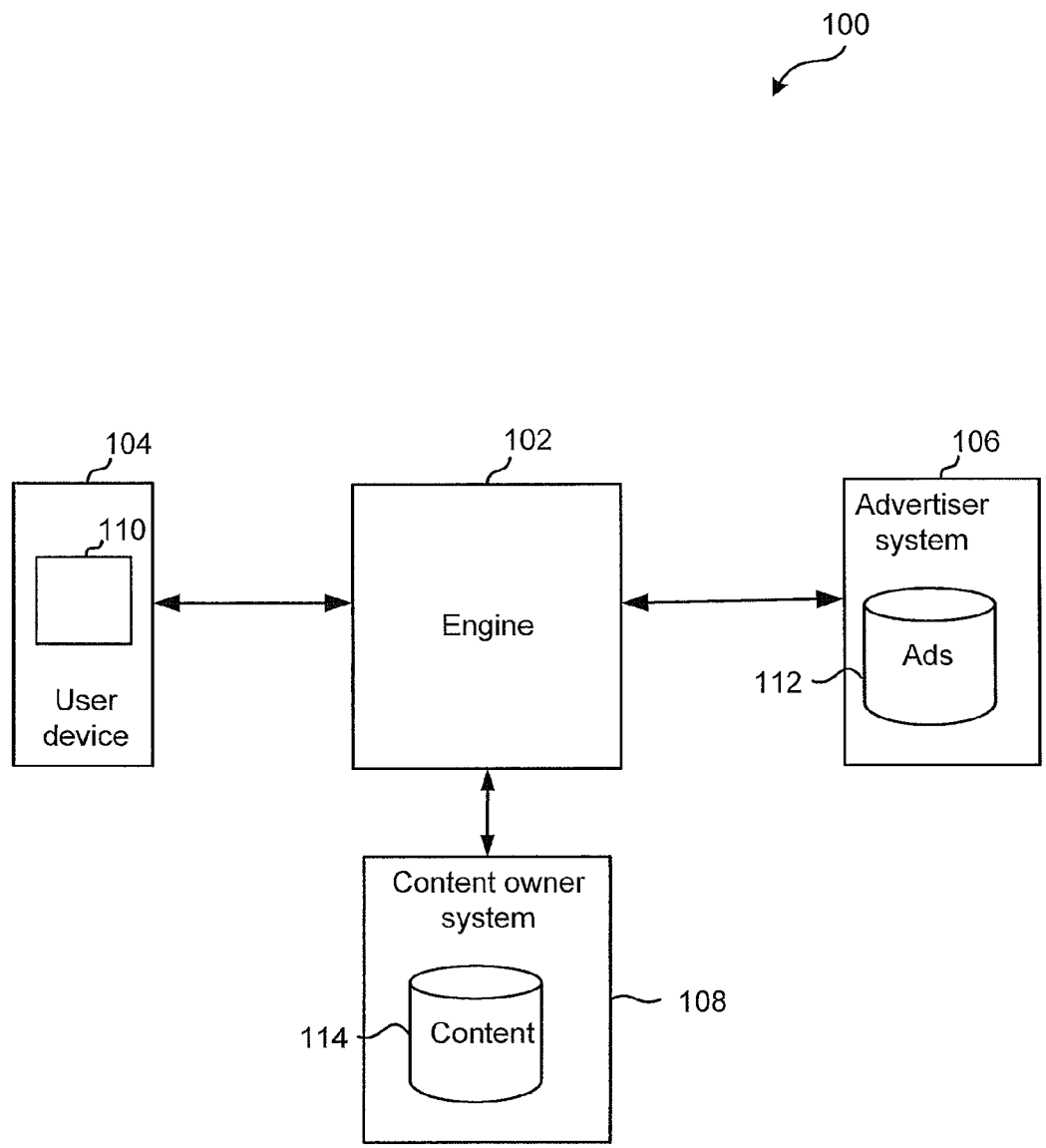
FIG. 1 depicts a simplified system for serving advertisements with rich media content according to one embodiment of the present invention.

FIG. 1 depicts a simplified system 100 for serving advertisements with rich media content according to one embodiment of the present invention. As shown, an engine 102, user device 104, advertiser system 106, and content owner system 108 are provided.

Engine 102 may be any device/system that provides serving of advertisements to user device 104. In one embodiment, engine 102 correlates advertisements to subject matter associated with rich media content. Accordingly, an advertisement that correlates to the subject matter associated with the portion of rich media content may be served such that it can be rendered on user device 104 relative to the portion of rich media content. Different methods may be used to correlate or match advertisements to portions of the rich media content.

Advertiser system 106 provides advertisements from advertisement database 112. Advertisements may be any content. For example, advertisements may include information about the advertiser, such as the advertiser's products, services, etc. Advertisements include but are not limited to elements possessing text, graphics, audio, video, animation, special effects, and/or user interactivity features, uniform resource locators (URLs), presentations, targeted content categories, etc. In some applications, audio-only or image-only advertisements may be used.

Advertisements may include non-paid recommendations to other links/content within the site or to other sites. The advertisement may also be data from the publisher (other links and content from them) or data from a servicer of engine (e.g., from its own data sources (such as from crawling the web)), or some other 3$^{rd}$ party data sources. The advertisement may also include coupons, maps, ticket purchase information, or any other information.

An advertisement may be broken into ad units. An ad unit may be a subset of a larger advertisement. For example, an advertiser may provide a matrix of ad units. Each ad unit may be associated with a concept. The ad units may be selected individually to form an advertisement. Thus, advertiser system 106 is not restricted to just serving an entire advertisement. Rather, the most relevant pieces of the advertisement may be selected from the matrix of ad units.

The ad units may perform different functions. Instead of just relaying information, different actions may be facilitated. For example, an ad unit may include a widget that collects user information, such as email address or phone number. The advertiser may then contact the user later with additional info about its products/services.

An ad unit may also include a widget that stores a history of ads. The user may use this widget to rewind to any of the previously shown ads, fast forward and see ads yet to be shown, show a screen containing thumbnails of a certain number of ads such that a user can choose which one to play, etc.

An ad unit may include a widget that allows users to send the ad to others. This facilitates viral spreading of the ad. For example, the user may use an address book to select users to forward the ad to. Further, an ad unit, when it is replaced by another ad unit, may be minimized into a small widget that allows the user to retrieve the ad, send to others, etc.

Different ways of creating an ad unit may also be appreciated. An ad unit may be created by applying a template on existing static ad units and turning them into video that may serve as pre/mid/post-roll. An ad unit may be created by taking a static ad and augmenting the unit with an advertiser-specified message dependent on context and keywords.

Advertisements will be described in the disclosure, but it will be understood that an advertisement may be any of the ad units as described above. Also, the advertisement may be a single ad unit or any number of a combination of ad units.

Advertiser system 106 provides advertisements to engine 102. Engine 102 may then determine when to serve advertisements from advertisement content 112 to user device 104. This process will be described in more detail below.

Content owner system 108 provides content stored in content database 114 to engine 102 and user device 104. The content includes rich media content. Rich media content may include but is not limited to content that possesses elements of audio, video, animation, special effects, and/or user interactivity features. For example, the rich media content may be a streaming video, a stock ticker that continually updates, a pre-recorded web cast, a movie, Flash™ animation, slide show, or other presentation. The rich media content may be provided through a web page or through any other methods, such as streaming video, streaming audio, pod casts, etc.

Rich media content may be digital media that is dynamic. This may be different from non-rich media content, which may include standard images, text links, and search engine advertising. The non-rich media may be static over time while rich media content may change over time. The rich media content may also include user interaction but does not have to.

User device 104 may be any device. For example, user device 104 includes a computer, laptop computer, personal digital assistant (PDA), cellular telephone, set-top box and display device, digital music player, etc. User device 104 includes a display 110 and a speaker (not shown) that may be used to render content and/or advertisements.

Advertisements may be served from engine 102 to user device 104. User device 104 then can render the advertisements. Rendering may include the displaying, playing, etc. of rich media content. For example, video and audio may be played where video is displayed on display 110 and audio is played through a speaker (not shown). Also, text may be displayed on display 110. Thus, rendering may be any output of rich media content on user device 102.

Figure 2:
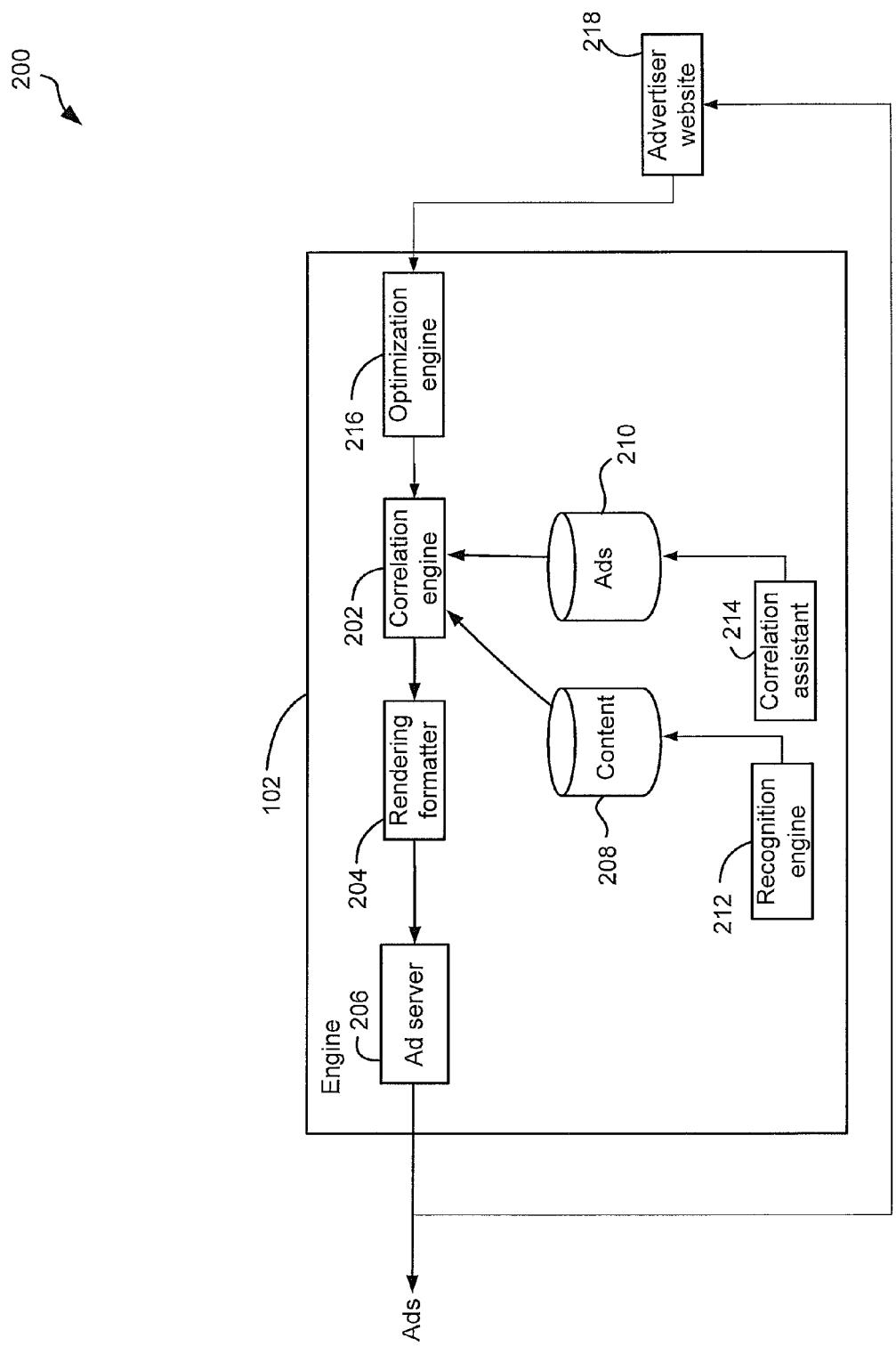
FIG. 2 depicts a more detailed example of the system shown in FIG. 1 according to one embodiment of the present invention.

In one embodiment, the advertisements are correlated to a portion of the rich media content. The advertisement can then be displayed relative to that portion in time. For example, the advertisement may be displayed in serial, parallel, or be injected into the rich media content. The different ways of rendering the advertisements relative to the rich media content will be described in more detail below.
Correlation FIG. 2 depicts a more detailed example of system 100 according to one embodiment of the present invention. As shown, engine 102 includes a correlation engine 202, a rendering formatter 204, an ad server 206, a content database 208, an ad database 210, a recognition engine 212, correlation assistant 214, an optimization engine 216 and advertiser web site 218.

Correlation engine 202 receives advertisements from ad database 208 and content from content database 208. The advertisements and content may have previously received from content owners and advertisers.

Correlation engine 202 is configured to determine an advertisement that correlates to subject matter associated with a portion of the rich media content. For example, at a certain time, period of time, or multiple instances of times, an advertisement may be correlated to subject matter in the rich media content. For example, an advertisement may be associated with a keyword. When that keyword is used in the rich media, correlation engine 202 correlates the advertisement to a portion of rich media content in which the keyword is used.

Correlation engine 202, when determining the advertisement, may determine one or more ad units that correlate to the subject matter. For example, based on one or more keywords, ad units from the ad matrix are determined. The ad units are then combined into an advertisement that is correlated to the subject matter. One example of this is BMW may provide a general ad unit for their logo and have a different ad unit for different models, such as the 330 model, 530 model, etc. The logo unit and each of the model units can be combined at runtime based on the context of the content. If the content talks about the 330 model then the logo and the 330 ad units may be combined and presented to the user.

Correlation engine 202 may also use user information to correlate advertisements to subject matter associated with a portion of the rich media content. User information may be any user information that is associated with a user of user device 104. For example, user information may include information about the behavior of a user. An account behavioral analysis of user information, such as from cookies, from account information, etc. may be used, in addition to contextual analysis of the content. This may help correlate which advertisements may be more relevant to the user based on the previous behavior of the user. Other user information may also include demographic data, recent sites visited by the user, and user actions such as mouse movement during presentation of an ad, etc. In one example, if the user had previously visited web sites for a certain advertiser, then it may be more effective to send the user an advertisement from that advertiser.

Correlation recognition detection techniques may be used to determine that the advertisement is correlated to the portion of rich media content. For example, keywords may be detected in the rich media using audio recognition. Audio recognition may include speech recognition, music detection on music portions, sound effect detection on sound effects, etc. Other techniques for keyword detection can include using preset word tags or indicators in the rich media content. Image recognition can be used on visual portions of the rich media content. For example, optical character recognition (OCR), facial recognition, object matching, etc. Other recognition techniques can be employed. For example, any suitable way of determining the content of rich media can be used to correlate a portion of the rich media content to an advertisement.

Recognition engine 212 receives rich media content that may be accessed by a user and uses correlation recognition detection techniques to recognize the content. In one embodiment, recognition engine 212 using audio recognition techniques, such as speech recognition, whereby the audio within the content would be recognized. In another embodiment, recognition engine 212 may be a video or visual analysis engine that generates data regarding the visual content of the rich media. In another embodiment, it could be natural language processing engine. In yet another embodiment, it may be an indexing engine that culls and processes textual meta-data associated with the content. Other audio recognition techniques may also be appreciated.

Recognition engine 212 is a processor that outputs relevant tags about the content that the rest of system 100 may use to match appropriate ads at the appropriate time when the content is accessed and played. For example, the information may be keywords recognized from audio in the content. Recognition engine 212 may generate a unique ID for each piece of content. In one embodiment, recognition engine 212 transcribes the audio within the content into text and related concepts. In the video or visual recognition embodiment, meta-data about the visual content is generated or culled from the content itself. In the textual meta-data embodiment, the meta-data is culled from the content and processed. Each concept, word, or meta-data may be time-stamped and stored in storage 208. It may be stored in a hash table, index, or database. This provides an index of information recognized from the content.

In some cases, recognition engine 212 may not definitively recognize a word. When uncertainty exists, such as with speech recognition or visual analysis, a lattice of the concepts, words, or meta-data are stored with associated probabilities. The lattice contains alternatives to the best choice when the probability associated with the best choice is low. Similar words may be determined and included in the lattice. Also, alternative words for words that are typically hard to recognize may also be included in the lattice.

The recognition may be performed in non real-time or in real-time. In non real-time, content owners submit their content to recognition engine 212 prior to an audience viewing the content. In the real-time embodiment, the content would be recognized as it is being accessed and played by users.

In determining when an advertisement correlates to subject matter associated with a portion of rich media content, a time to render the advertisement relative to the content that maximizes one or more criteria may be determined. For example, correlation engine 202 may determine a sequence of advertisements that maximize revenue. These advertisements are time aligned to correlate to the subject matter to maximize the revenue.

Advertisers may buy correlation information, such as keywords, phrases or concepts, either through a bidding process or some other means, and submit their ads and related information to correlation engine 202 though correlation assistant 214. Keywords may be words that can be used to match information in the content. The phrases may be any combination of words and other information, such as symbols, images, etc. The concepts may be a conceptual idea of something. For example, if a portion of rich media talks about Lebron James, this can be conceptualized to basketball, and we can match advertisements to basketball to the rich media even if for some reason the exact term "basketball" is not mentioned. The related information includes but is not limited to URLs, presentations of ads, targeted content categories, etc. to be associated with the ad space or inventory they have bought. The advertiser can also specify anti-keywords, phrases, or concepts. An anti-keyword is a keyword or phrase that an advertiser chooses such that if that keyword or phrases is recognized in the rich media content, the advertiser's ad would not be shown, even if there is a keyword/phrase match.

The selection of normal/anti-keywords, normal/anti-phrases, and normal/anti-concepts is useful for ad matching performance. For example, if General Motors purchases the keyword "General Motors" for its ad, the ad may very well be matched to a video discussing a General Motors layoff, if the anti-keyword "layoff" is not selected. To prevent these matches, correlation assistant 214 determines appropriate content for advertiser's ads. Once advertisers enter their desired keywords, phrases, or concepts, correlation assistant 214 may present other text correlated to those keywords. The other test may be based on analysis of historic content in the recognized content. Also, the related text may also be taken from external knowledge sources and databases. For example, a spider may search the web for popular news stories. The news stories may be indexed and words may be determined that are found in the stories. If the word "General Motors" occurs frequently near the word "layoff" in the index, correlation assistant 214 may suggest the term "layoff" when "General Motors" is chosen. The advertiser can then specify whether each of the desired keywords or text fragments suggested correlation assistant 214 is positive, neutral, or negative to the content they would like to target. In this way, the advertiser can better refine their selection. A list of anti-keywords may then be determined and stored in storage 210.

Also, the keywords that an advertiser wants to bid on may also be determined using correlation assistant 214. Suggestions as to which keywords may be associated with an advertiser may be provided. The more popular keywords may then be bid on by the advertiser. By showing how popular a keyword is, higher bids may be received or required. Also, when a keyword is bid on by an advertiser. Correlation assistant 214 may display similar keywords for an advertiser to choose from. This may give an advertiser more keywords to bid on or even better keywords that may result in better matches.

Advertisers may also specify other associations for their ads. Such associations may include but are not limited to keyword/anti-keyword, phrase/anti-phrase, concept/anti-concept, and domain category/anti-category. A category may refer to sports, news, business, entertainment, etc.

Correlation assistant 214 may generate a unique ID for each ad submitted. These ads and related information would be stored in storage 214 as an index or other data structure. In one embodiment, each ad unit may be identified. For example, a matrix identification system may be used to identify different ad units for an advertiser.

The data and meta-data (for example, spoken words and concepts) of the indexed and time-stamped content are stored in storage 208. Correlation engine 202 may relate a unique content ID with a time series of keywords and concepts (that advertisers have purchased), and in turn, relate the keywords and concepts to ads submitted by advertisers.

Figure 7:
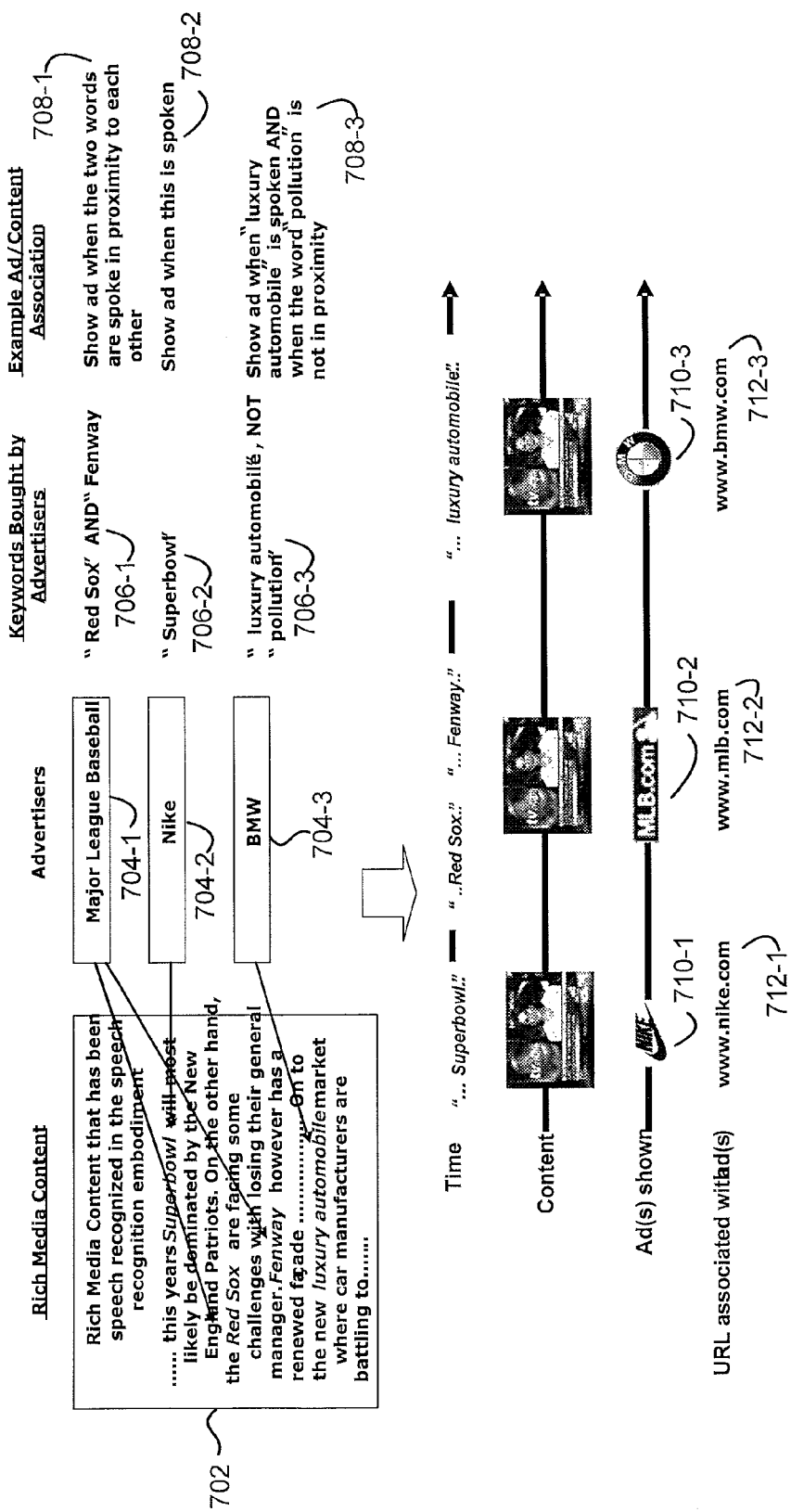
FIG. 7 shows an example of how content may relate to keywords purchased by advertisers according to one embodiment.

FIG. 7 shows an example of how content may relate to keywords purchased by advertisers according to one embodiment. A recognition of content 702 is shown. This is a text version of rich media content. For example, a newscast has been translated from speech to text using speech recognition techniques.

The ads may be correlated to content in different ways. In one embodiment, keywords may be associated with each ad. Content may be searched to determine if the content includes the keywords. Then the ad may be correlated to the content. For example, an index of keywords may be generated for each piece of content. The correlation may be performed for all ads and a series of ads may be matched to different content in storage 208.

In another embodiment, keywords in a piece of content may be determined. Different ads that correlate to the content may then be determined. For example, for each keyword determined, one or more ads that are associated with the keyword are determined. The ads to display may then be selected.

The correlation may be performed in non real-time or in real-time. In the non-real time embodiment, correlation engine 202 may perform the correlation at regular intervals.

In one example of correlation in the non real-time embodiment, for each ad, correlation engine 202 finds candidate content that may be relevant. This is done by searching for content in the index to match the keywords, categories, and concepts associated with the ad to information in the content. Correlation engine 202 may perform the search not only on the top choices (e.g., keywords) generated by recognition engine 212, but on the entire lattice of possible alternatives. The content index may also include a long tail of words, especially proper nouns such as names and foreign entities. This long tail includes many proper nouns such as names and foreign entities. When an out-of-vocabulary keyword is associated with an ad, that word is converted to other in-vocabulary words with similar phonetic make-up.

For each piece of candidate content associated with an ad, correlation engine 202 determines candidate times where the content may be relevant to the ad. Correlation engine 202 locates the times where the keywords and concepts match. For each candidate time, correlation engine 202 creates an "ad anchor" holding the score for the match. The score may be a linear combination of the following weights:

1. Probability of the keyword/concept match pulled from the recognition lattice.
2. Concentration of the match—the more keywords/concepts for the ad matches near the time, the higher the score. One embodiment of this score may be a count of the number of matches within a certain window of the current time.
3. Position of match relative to other matches—the more likely that the current time starts a segment on the keywords/concepts, the higher the score. One embodiment of this score may be the inverse of a count of the number matches before a certain amount of time.
4. Historical performance—the prior performance of an ad. For example, if an ad previously placed resulted in a user selection of the ad, the ad may be considered a better match.
5. Price of the ad placement—the price of the bid may be taken into account to determine the match. For example, higher bids for the ad may be considered better matches. Also, higher bids may be placed in a separate area of the display screen, etc.
6. Geo-location match—the area where the content may be displayed may be considered in matching the ad to content.
7. Demographic—a classification of a user, such as age bands, social class bands, and gender.
8. Behavioral—the actions or reactions of an object or organism, usually in relation to the environment.
9. Psychographic profile—any attributes relating to personality, values, attitudes, interests, or lifestyles.
10. Past performance—the past performance of an ad.

For each piece of content, correlation engine 202 may prune away the low scoring anchors. For example, a threshold may be used where anchors below the threshold are not considered. For each remaining anchor, correlation engine 202 extends the segment for the ad to the minimum time for the ad. This is either a global minimum or a setting configured by the advertiser or content owner. For example, if the ad is a logo, the logo may be displayed for the minimum amount of time.

For each pair of overlapping ads, correlation engine 202 disambiguates the overlapping ads by selecting the ad with the higher score. Remaining empty space may be filled by extending the previous ad, filling it with pruned ads, or by filling with ads that score generically well. Also, ad units may be chosen to fill in the space. If ads are in 5 second intervals, the best matching 5 second intervals may be chosen depending on how much empty space there is to fill.

In the real time embodiment, recognition engine 212 may determine keywords from the content. As recognition engine 212 produces a streaming lattice of keywords or concepts, a rolling window of the lattice is used to look up potentially relevant ads. Whenever a possible relevant ad is found, the ad is scored in the same way as in the non-real time case. Correlation engine 212 makes an immediate decision on whether the ad is appropriate. A hard threshold may be used to make the determination. The value of the threshold is determined experimentally to optimize relevance and minimize false acceptances.

As shown in FIG. 7, advertisers 704 have keywords 706 associated with ads. Also, association rules 708 are provided that guide when to correlate an ad to the keyword.

Advertiser 704-1 is the Major League Baseball and has specified the keywords "Red Sox" and "Fenway". The ad may be correlated to the keyword when the two words are found in content proximate to each other. For example, the words may have to be within a certain number of words in the content.

Advertiser 704-2 is Nike and the keyword "Superbowl" is associated with it. The ad for Nike may be shown when the keyword Superbowl is spoken in content.

Advertiser 704-3 is BMW and the keyword "Luxury Automobile" is associated with it. Also, an anti-keyword shown as NOT "pollution" is also associated with BMW. In this case, when the word luxury automobile is spoken without the word pollution in proximity, then the BMW ad may be matched to the content.

As shown in content 702, the keywords are found for all three advertisers. The ads may be correlated to the content at the time the words are spoken in the content. As shown in FIG. 8, as the words are spoken, as advertisement for each advertiser 704 is shown.

In one embodiment, a logo 710 for advertisers 704 is shown and displayed in parallel with the content. Other display options may be used and are described herein. A uniform resource locator (URL) 712 may be associated with the ads. For example, when the ads are selected or clicked on, a window may be opened and redirected to the URL.

The information shown in FIG. 7 may be stored as a table or tables relating content and content-related information, time series to display ads and time series-related information, and characterizations of the ads to be displayed (ad ID, presentation of ad, URL of ad, etc.). This then in effect relates ads to content. In the real-time embodiment, the content is processed by the recognition engine and matched with ads as the content is being played to a user.

FIG. 8 shows an example of the scoring system according to one embodiment. As shown, recognized text for a piece of content is shown in block 802. In this example, Motorola owns the keyword "razr", Verizon owns the keyword "e.v.d.o.", T-Mobile owns the keyword "g.p.r.s.", and Seagate owns the keyword "megabyte diskdrive". Correlation engine 202 recognizes the content with the exception of "megapixel camera" being misrecognized as "megabyte diskdrive". In this case, the spoken word was recognized as the wrong word, which may happen from time to time depending on the recognition engine that is used. Note that "razr" shows up twice in the transcript hence is scored twice.

The scores in table 804 may correspond to any of the 10 weights described above. More or fewer weights may be included in table 804. As shown, five weights are being used. All the recognition scores are similar except the misrecognized phrase gets a much lower score. The recognition score may be related to the confidence that the word was properly recognized. The match concentration score is highest for "razr" because the word shows up twice near each other, whereas the other keywords only show up once.

The match position scores are similar except for the second occurrence for "razr" since initial positions are preferred. In this example, the ad is new so no score is found for any past performance scores. However, if an ad was previously placed and was considered a good placement, the past performance score may be high. For example, if an ad is selected by a user when it was placed, it may receive a good performance score. Also, if the ad was selected and then the user purchased something from the advertiser, then the performance score may be even higher.

The ad cost/price also shows that Motorola has bid the most for the keyword razr. Accordingly, it has the highest score for the ad cost/price. However, if Verizon had bid more for e.v.d.o, then it might have skewed the final weight in its favor and thus Verizon's ad may be placed.

Based on the scores, Motorola wins the ad placement in this segment and the ad is shown right after the first occurrence of "razr". If, however, the placement is made, and nobody selects or clicks on the Motorola ad, but on the other hand, the Verizon ad has found success elsewhere with the keyword "e.v.d.o.", the next iteration of the scoring will likely award the placement to Verizon, increasing the potential revenue from the placement. Optimizer engine 216 may receive previous performance information from advertiser website 218. For example, clickthrough information, purchase information, and billing information, and other user interaction information may be received. This information may be used to determine a past performance score.

Rendering

In determining when an advertisement correlates to subject matter associated with a portion of rich media content, a time to render the advertisement relative to the content that maximizes one or more criteria may be determined. For example, correlation engine 202 may determine a sequence of advertisements that maximize revenue. These advertisements are time aligned to correlate to the subject matter to maximize the revenue.

Rendering formatter 204 then determines how the advertisement should be rendered relative to a time the portion of the rich media content is being played. For example, rendering formatter 204 can determine that an advertisement should be rendered serially relative to the portion of rich media content, in parallel to the portion of rich media content, or injected into the rich media content. In other embodiments, the advertisements may be stored for later display by a user. For example, at any time, the stored advertisements may be displayed even if the rich media content is not being played. In one example, the advertisements may be stored in a folder. An icon may be inserted in display 110, which can be selected and used to cause display of the stored advertisements.

When an advertisement is rendered serially relative to a time the portion of the rich media content is being played, it can be rendered post-roll or pre-roll. Post-roll is after the time the portion of rich media content is displayed. For example, the portion of the rich media content may be played and then the advertisement may be rendered after the portion is played. In one example, a media player may be playing the rich media content. When the portion of rich media is finished playing, the advertisement may be rendered using the player. Thus, a user can only watch the rich media content or the advertisement. In other embodiments, the advertisement may be rendered in a different area of display 110 but the playing of the rich media content is stopped while the advertisement is being played.

In the pre-roll case, the advertisement may be rendered before the portion of rich media content is played. Accordingly, in this case, either the advertisement or the portion of rich media content is being rendered at one time. A variation on this case allows the advertisement to begin playing before the rich content and to continue playing with (i.e., overlap with) the content after the content starts playing. Similarly, a portion of post-roll advertising may overlap with the end of the rich media content.

In the parallel case, the advertisement may be rendered at substantially the same time the portion of rich media content is being played. It should be noted that at any time during the portion of rich media content being played, the advertisement may be rendered. The advertisement does not have to be rendered for the entire time the portion of rich media content is being played. Also, the advertisement may be rendered at other times when the portion of rich media content is not being played. For example, the advertisement may continue to be rendered after the portion of rich media content has finished being played.

For the parallel case, the advertisement may be rendered in a separate portion of display 110. For example, in a different window. Also, other methods may be contemplated, such as the advertisement is rendered in a cut out section of a window playing the rich media content, in a pop up window, overlaid on the rich media content, as audio, etc.

The advertisement may also be injected into the portion of rich media content. For example, as the portion of rich media content is being played, the advertisement may be rendered in the rich media content.

Rendering formatter 204 may receive user preferences, content provider preferences, and/or advertiser preferences and use them to determine how the advertisement should be displayed. Although these preferences are discussed, it will be understood that any other preferences may be used.

User preferences may be any settings that are associated with a user of user device 104. For example, users may prefer to view advertisements in certain ways. Also, user preferences may indicate a type of user device 104. This may cause different rendering preferences to be used. For example, if the user is using a smaller user device 104, such as a PDA, then advertisements may be served serially. This is because a display 110 on the PDA may be too small to display advertisements in parallel. However, if a user is using a user device with a larger display, such as a laptop computer, then advertisements may be served in parallel because the display is larger and may be able to accommodate displaying both the advertisement and rich media content at the same time.

Content provider preferences may be preferences specified by the content provider. For example, a content owner may only want advertisements shown in parallel because it does not want its content interrupted. Some kinds of content may be more effective if the advertisements are shown in parallel such as movies. However, some content, such as sporting events, may be better suited for showing advertisements serially.

Advertiser preferences are preferences that may be associated with an advertisement. An advertiser may set these preferences; however, other entities, such as an owner of engine 102, may also set these preferences. The advertiser preferences may be optimal ways of rendering the advertisement, such as positioning of the advertisement relative to the content, sizing the ad, animating the ad, etc. Any other factors that affect presentation time or effect upon a viewer can be included in advertiser preferences and can become part of a payment program or advertising plan. For example, sponsors that pay more can have their ads presented multiple times over other sponsors who have not paid as much. This can work where multiple sponsors desire that their ads be shown during the same content. Priority can be given to preferred (e.g., higher-paying) sponsors so that the preferred sponsor ads are displayed more often, in place of, or more prominently than non-preferred sponsors.

Advertising plans can include consideration for the amount of time that an ad is relevant. Preferred sponsors can have their ads presented during the longer relevant intervals while non-preferred ads are allocated to the shorter intervals. If the correlation engine is sophisticated enough to determine qualities such as "impact" (e.g., dramatic or impressionable impact to a viewer) then preferred sponsor ads can be given priority for the dramatic correlations. A dramatic correlation can be, for example, a hurricane report or other impending weather condition correlating with ads for sales of provisions, survival or safety equipment. Another type of dramatic correlation can be an announcement that an entertainer is going on tour with a correlation to an ad for ticket purchases. Many other types of correlations are possible and they can be ranked and matched to sponsors in various ways to achieve optimized revenue models for a company operating the advertising server or acting as a management or sales entity for such a system.

There may be rules that specify which preferences are used if preferences conflict. For example, the advertiser preferences may trump any conflicts with user preferences or content owner preferences. Also, the preferences may indicate that the advertisement should be moved in space. For example, if the keyword used is "BMW" but the advertisement is for a Cadillac, BMW may not a Cadillac advertisement so close to when it is being mentioned. Thus, the Cadillac ad may be moved away from the rich media content being played or it may be delayed until a later time when the rich media content is not being mentioned anymore.

Once rendering formatter 204 determines rendering preferences, ad server 206 is configured to serve the advertisement. The advertisement may be served as a function of time, serially or in parallel or injected, in terms of presentation vis a vis the rich media content. In serving the advertisement, ad server 206 sends it to user device 104 for display. The serving may occur substantially at a time when it should be rendered with the rich media content. Also, the serving may occur prior to when the advertisement should be rendered. For example, the advertisement may be pre-loaded onto user device 104. User device 104 can then render the advertisement when it is appropriate according to the rendering preferences.

Also, in other embodiments, ad server 206 may serve the advertisement for storage in user device 104. For example, the advertisement may be stored and at a later time rendered. In one example, an icon may be displayed in display 110 and the user can select the icon causing display of the advertisement.

Figure 3A:
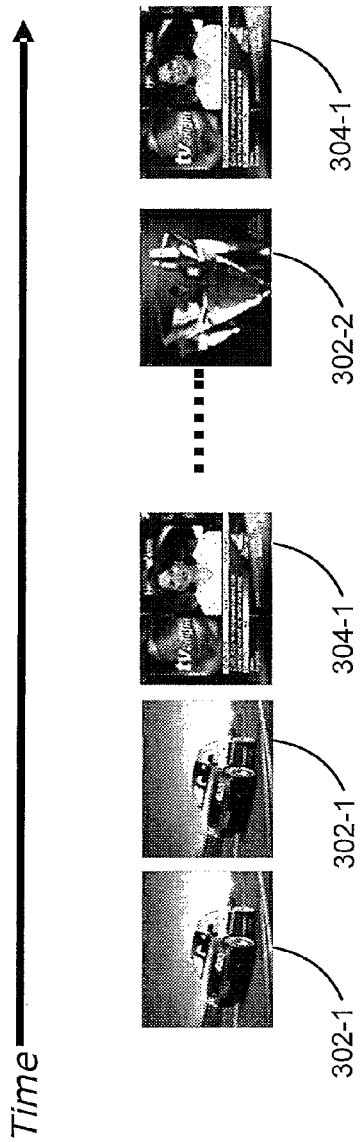
FIG. 3A depicts a video example of rendering advertisements serially according to one embodiment of the present invention.

FIG. 3A depicts a video example of rendering advertisements serially according to one embodiment of the present invention. As shown, advertisement 302 is rendered and video 304 is played in display 110. An advertisement 302-1 may be shown pre-roll to video 304. In one example, the video may be talking about a certain kind of car, such as the newscaster shown is talking about an automobile. In this case, an advertisement for a company that has purchased the keyword "automobile" may be shown before video 304. For example, every time the word automobile is used, an advertisement for a BMW car is shown. After showing the advertisement, video 304 is shown. The content may continue until a second advertisement 302-2 is shown.

Second advertisement 302-2 may be shown post-roll or pre-roll to either video 304-1 or video 304-2. For example, if advertisement 302-2 is shown post-roll, then subject matter in a portion of rich media content 304-2 may be correlated to advertisement 302-2. After video 304-1 is shown, advertisement 302-2 is shown. If advertisement 302-2 is shown pre-roll, then subject matter in video 304-2 is correlated to advertisement 302-2. Advertisement 302-2 is shown before video 304-2 in this case.

Figure 3B:
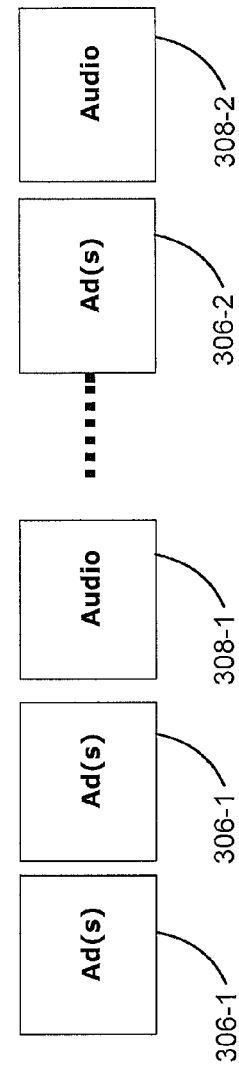
FIG. 3B shows an audio example of rendering advertisements serially in rich media content that includes audio according to embodiments of the present invention.

FIG. 3B shows an audio example of rendering advertisements serially according to embodiments of the present invention. As shown, advertisement 306-1 may be rendered before audio 308-1 is played. In one embodiment, advertisements 306-1 may be displayed visually. Also, it will be recognized that advertisement 306-1 may be an audio advertisement such that it can match the content that is being played. Also, a combination of video and audio advertisements 306-1 may be provided. This may be set by the preferences determined in rendering formatter 204.

After rendering of advertisements 306-1, audio 308-1 is played. A second advertisement 306-2 is then played in between audio 308-1 and audio 308-2. Advertising 306-2 may be correlated to subject matter in either audio 308-1 or audio 308-2 and played post-roll or pre-roll.

Figure 4A:
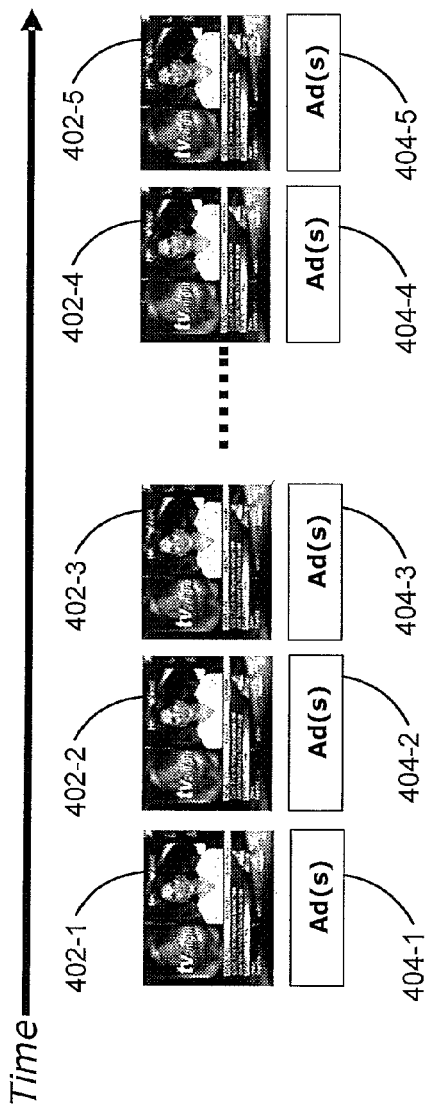
FIG. 4A depicts a video example of rendering advertisements in parallel according to embodiments of the present invention.

FIG. 4A depicts a video example of rendering advertisements in parallel according to embodiments of the present invention. As shown, advertisements 404 are rendered in parallel to video 402. As the video is being displayed, advertisements 404 may be rendered. In one embodiment, advertisements 404 may be displayed along with video 402. In one embodiment, each advertisement 404-1-404-5 may be a different advertisement. However, it will be understood that advertisements may persist across multiple frames of video 402. For example, during the playing of video 402-1 to 402-3, subject matter may be correlated to an advertisement. This advertisement may be displayed in advertisements 404-1 to 404-3.

At another time during the playing of video 402-4 and 402-5, a different advertisement may be correlated to subject matter in the video. Thus, a different advertisement is displayed for advertisements 404-4 and 404-5.

The advertisements displayed may be of a form that does not interfere with rendering of the video. For example, if the video includes audio, then a text advertisement may be shown. This does not interfere with the playing of audio of the video. Also, the advertisement may include video without sound such that it does not interfere with the audio of the video.

Figure 4B:
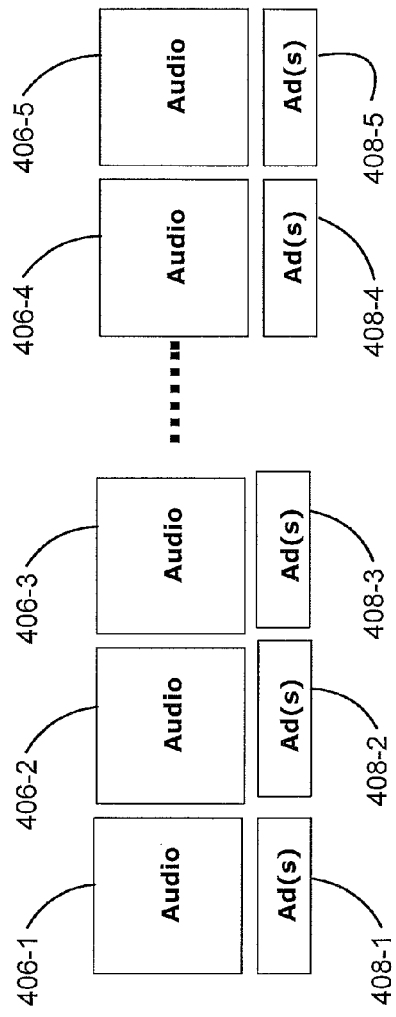
FIG. 4B depicts an audio example of rendering advertisements in parallel according to embodiments of the present invention.

FIG. 4B depicts an audio example of rendering advertisements in parallel according to embodiments of the present invention. As audio 406 is rendered, advertisements 408 are rendered. In one embodiment, advertisements 408 are rendered in form that does not interfere with the audio. For example, the advertisements may be rendered as video without audio or text.

Advertisements 408 may be associated with subject matter in the audio for audio 406. As audio is being rendered, advertisements 408 may be rendered in parallel.

Serving Ads

Figure 5:
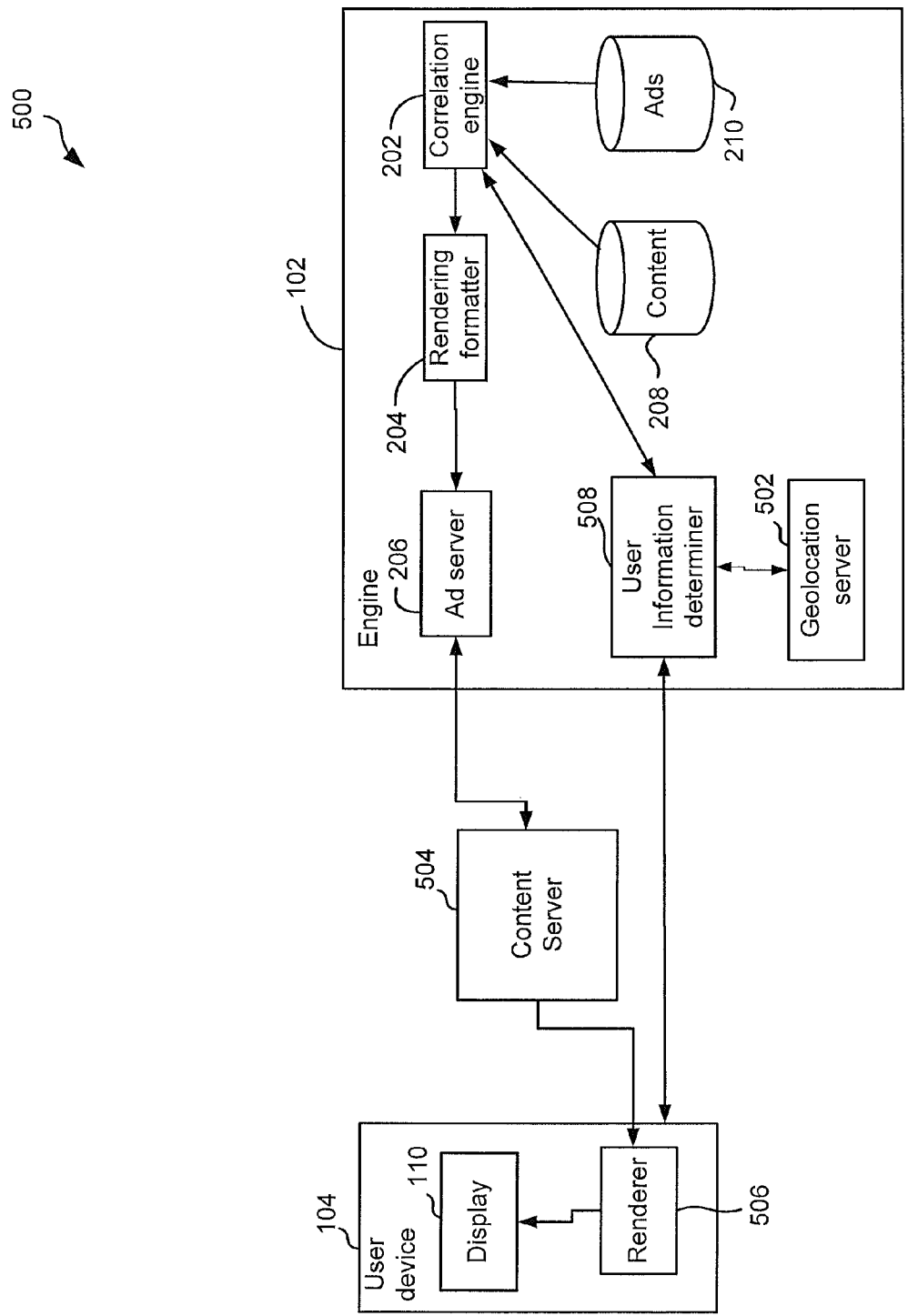
FIG. 5 depicts a system for initiating serving of advertisements according to one embodiment of the present invention.

FIG. 5 depicts a system 500 for initiating serving of advertisements according to one embodiment of the present invention. A content server 504 is used to serve content to user device 104. For example, content server 504 may receive content from content owners 108 and send it to user device 104.

In one embodiment, content server 504 may serve a web page to user device 104 for display in display 110. When the rich media content is served to user device 104, content server 504 contacts engine 102 to notify engine 102 that content is being served. In one embodiment, content server 504 includes software code that enables it to connect with engine 102. For example, software code may be embedded in a web page. Also, the code may be integrated in the rich media content being served. It will be understood that there may not be a need to integrate any code and it depends on the functions of the content server 504 being used.

Content server 504 contacts ad server 206 with information needed by engine 102 to serve advertisements with rich media content. For example, the information may include an identifier for the content being served, other content-related data, a time of the content as it is being played, user interaction data, an IP address of user device 104, any other routing information, and any other data relating to user device 104, content server 504, etc.

An identifier for the content being served may be converted into a content ID that is recognized by ad server 206. With a content ID, correlation engine 202 can then determine advertisements to correlate to the rich media content. For example, different advertisements may be correlated to content associated with the content ID previously. The correlating may have been performed when a content provider uploaded the content to engine 102. The advertisements that are correlated to the rich media content are then stored with the content ID. In other embodiments, the correlation may be performed dynamically as content is being displayed at user device 104.

A user information determiner 508 may be used to determine information about the user. As discussed above, the user information may be any information associated with the user and may be used to correlate advertisements to the content. In one embodiment, user information determiner 508 may interact with user device 104 to determine the user information. For example, user device 104 may send a cookie to information determiner 508.

A geo-location server 502 may be used to determine any location information that might be useful in serving advertisements. For example, an IP address may be converted into a physical geographical location of the user for user device 104. This may be used to serve advertisements in a more relevant fashion, such as different ads are served based on the location, different languages are used, etc.

Correlation engine 202 may use any of the above information to perform the correlation. Once the advertisements are determined by correlation engine 202, rendering formatter 204 determines how to render the content. Preferences described above may be used to determine how to render the content and advertisement.

Ad server 206 may then use the geographic location or IP address to serve the advertisement to user device 104.

In one example, if BMW has purchased/associated a keyword "automobile" for their advertisement, and rich media content includes the keyword "automobile" as it is rendered, the BMW ad may be served. It may be served and rendered in parallel, near, around, in, or on the rich media content as the keyword "automobile" is being spoken. In another example, the BMW ad may be rendered serially before and after the keyword "automobile" is played.

In another example, audio ads may be serially matched with pod casts (audio programs from the Internet) where the advertisements are placed in front, in the middle, or after the audio content. In addition, text or video ads may be displayed in parallel with the audio.

A user can interact with the advertisements served. For example, the user may launch events from user device 104. In one embodiment, a user may select the advertisement and launch another window with a website of the advertiser's choosing. In this example, when a user interacts with the advertisement, software code embedded (if there is any) in the advertisement sends relevant data to ad server 206. Ad server 206 can then contact a billing and click-through server and update billing data to recognize that the advertisement has been selected. The data relating to the user interaction with the advertisements may be fed back to correlation engine 202 to further optimize matching of advertisements with rich media content.

Figure 6:
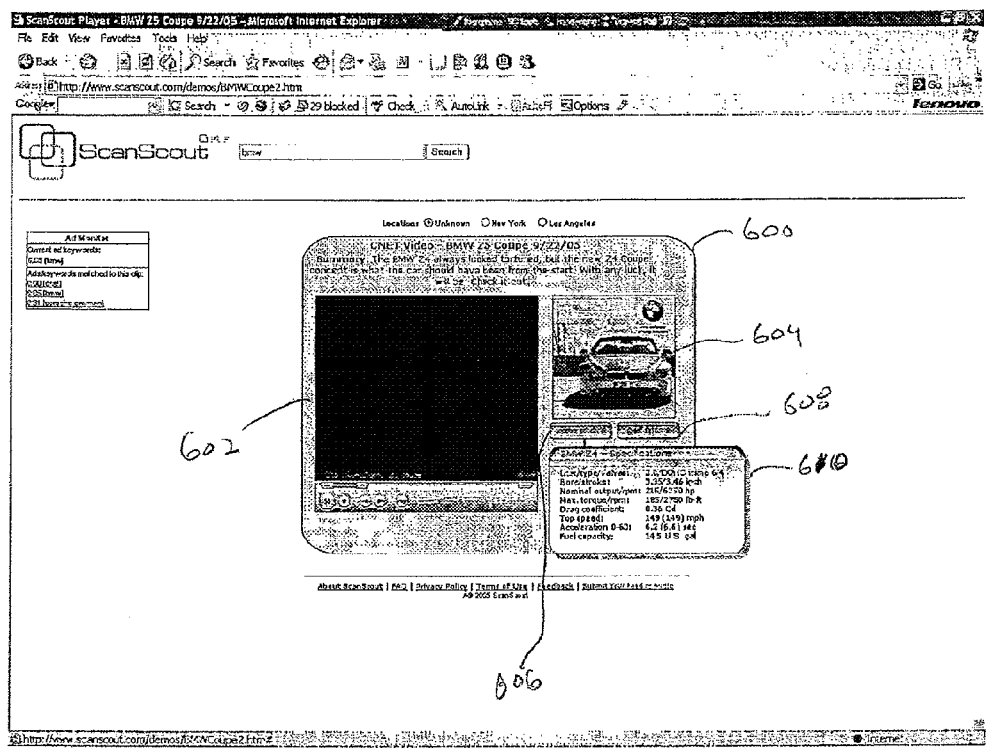
FIG. 6 shows an example interface according to one embodiment.

Other features may also be provided as a user interacts with the advertisements served. FIG. 6 shows an example interface 600 according to one embodiment. Rich media content may be displayed in media player 602. Also, an advertisement is being rendered in section 604.

The advertisement may be a video and/or an image of an advertisement. A user may also trigger actions by interacting with interface 600. For example, the rich media content may be played in player 602. An image of the advertisement is shown in section 604 (in other examples, a video may be playing without sound). The advertisement, however, may also be a video advertisement. Because playing two videos at once may be confusing to the user, a trigger is used to determine when to play the advertisement and/or rich media content. For example, a mouse-over feature is provided. When a mouse is moved over advertisement 604, the advertisement may start playing and the rich media content is stopped. This allows the user to choose when to play the advertisement or rich media content. If the user is interested in an advertisement that is shown, the user can choose to view the advertisement. When the user is finished (e.g., the mouse is moved away from section 604) or the advertisement is finished playing, the rich media content may begin playing again. Other ways of triggering playing of the advertisement may also be appreciated, such as the selection on a touchscreen, input of a shortcut key, double or single selection of window 604, etc.

The advertisement may also include widgets 606 and 608 that allow additional features to be invoked. For example, widgets 606 and 608 provide additional information for the advertisement. The additional information may be provided while the rich media content is playing. This feature may allow the user to view more information about the advertisement without interrupting the rich media content. Also, the rich media content may be paused.

Widget 604, when triggered, may show additional information in a pop-up window 610. For example, a user may move the mouse pointer over widget 606, which then displays the pop up window 610. In this case, more information is shown for the advertisement. If the user moved the mouse over widget 608, a window may pop up allowing the user to get more information. For example, the user may be able to enter an email address where more information about the advertisement can be sent. Other ways of triggering widgets 606 and 608 may also be appreciated, such as the selection on a touchscreen, input of a shortcut key, the double or single selection of widgets 606 and 608, etc.

Other interactive features may also be provided. For example, coupons and maps may be provided. Coupons for the advertisement may be displayed with the advertisement. A user may select the coupon and be sent to a web page that allow redemption. Also, selecting the coupon may send the user the coupon at a user's email address, etc. Including a coupon provides incentive for a user to either view the ad or actually take action to purchase a product shown in the ad.

Also, a map may also be included. The map may show local businesses that are selling products depicted in the advertisement. Also, links to the local businesses may be provided. If user's select the links, fees may be charged to the local businesses by an owner of system 100. The maps show an easy way for a user to purchase the product in the ad.

Further, other services may be provided. For example, a link to buy tickets for movies may be provided when a movie is being watched.

Although the invention has been described with respect to specific embodiments thereof, these embodiments are merely illustrative, and not restrictive of the invention. For example, ads can be presented in various types of association with rich media content. If a first device is used to present the rich media content, a separate second device can be used to display the rich media content.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

We claim:

1. A non-transitory processor-readable medium storing code representing instructions for correlating advertisements to rich media content, the instructions configured to cause a processor to:

extract a subject matter contained in each segment from a plurality of segments of an item of rich media content, presented on a webpage at a device, using one or more recognition techniques selected from a group consisting of audio recognition, image recognition, and semantic analysis;

select an advertisement from among a plurality of advertisements to associate with each segment from the plurality of segments of the item of rich media content based at least in part on (1) an Internet Protocol (IP) address of the device, and (2) a first temporal position within a segment from the plurality of segments of a first concept match relative to a second temporal position within that segment of a second concept match; and send to the device via a network the advertisement associated with the segment from the plurality of segments such that the advertisement is injected into the item of rich media content on the webpage at a third temporal position within the segment based on the first temporal position and the second temporal position.

2. The non-transitory processor-readable medium of claim 1, wherein the code representing instructions configured to cause the processor to select includes code representing instructions configured to cause the processor to:

determine match information associated with the advertisement from the plurality of advertisements;

determine when the match information is found in at least one segment from the plurality of segments of the item of rich media content; and select the advertisement when the match information is found in the at least one segment from the plurality of segments of the item of rich media content.

3. The non-transitory processor-readable medium of claim 1, wherein the code representing instructions configured to cause the processor to select includes code representing instructions configured to cause the processor to:

determine a score for one or more criteria for each advertisement from the plurality of advertisements; and select the advertisement based at least in part on the score for each advertisement from the plurality of advertisements.

4. The non-transitory processor-readable medium of claim 3, wherein the one or more criteria includes a bid price for the advertisement, an amount of the bid price affects the score given to the advertisement.

5. The non-transitory processor-readable medium of claim 4, wherein the code representing instructions configured to cause the processor to select includes code representing instructions configured to cause the processor to select such that revenue from bids associated with the plurality of advertisements is maximized.

6. The non-transitory processor-readable medium of claim 1, the code further representing instructions to cause the processor to:

receive a predefined positional relationship criteria associated with the first concept match and the second concept match and based in part on an anti-keyword, the code representing instructions configured to cause the processor to select the advertisement includes code representing instructions configured to cause the processor to select the advertisement when the first temporal position and the second temporal position meet the predefined positional relationship criteria.

7. The non-transitory processor-readable medium of claim 1, wherein the code representing instructions configured to cause the processor to extract includes code representing instructions configured to cause the processor to extract the subject matter contained in a segment from the plurality of segments based on a concept associated with at least one keyword within the segment, the at least one keyword being different from the concept.

8. The non-transitory processor-readable medium of claim 1, wherein the code representing instructions configured to cause the processor to select the advertisement includes code representing instructions configured to cause the processor to select the advertisement based in part on an occurrence of an anti-concept associated with the rich media content.

9. The non-transitory processor-readable medium of claim 1, wherein the code representing instructions configured to cause the processor to extract includes code representing instructions configured to cause the processor to extract the subject matter contained in a segment from the plurality of segments based on a concept associated with an image within the segment.

10. The non-transitory processor-readable medium of claim 1, wherein the advertisement associated with a segment from the plurality of segments includes a coupon associated with the rich media content.

11. The non-transitory processor-readable medium of claim 1, wherein the code to cause the processor to select includes code to cause the processor to select the advertisement from among the plurality of advertisements to associate with each segment from the plurality of segments of the item of rich media content based at least in part on a probability of the first concept match within the plurality of segments.

12. The non-transitory processor-readable medium of claim 1, wherein the code to cause the processor to select includes code to cause the processor to select the advertisement from among the plurality of advertisements to associate with each segment from the plurality of segments of the item of rich media content based at least in part on a concentration of one or more first concept matches within the plurality of segments.

13. The non-transitory processor-readable medium of claim 1, further comprising code to cause the processor to:

identify a display size of the device, the code to cause the processor to send the advertisement includes code to cause the processor to modify the advertisement associated with the segment from the plurality of segments included in the item of rich media content based on the display size.

14. The non-transitory processor-readable medium of claim 1, wherein the code to cause the processor to send includes code to cause the processor to send the advertisement associated with the segment from the plurality of segments such that the device selects content to be presented via the webpage based on the item of rich media content including the advertisement.

* * * * *

UNITED STATES PATENT AND TRADEMARK OFFICE
CERTIFICATE OF CORRECTION

| | | |
|---|---|---|
| PATENT NO. | : 9,563,826 B2 | Page 1 of 1 |
| APPLICATION NO. | : 13/408459 | |
| DATED | : February 7, 2017 | |
| INVENTOR(S) | : Wai Kit Lau | |

It is certified that error appears in the above-identified patent and that said Letters Patent is hereby corrected as shown below:

In the Specification

Column 1, Line 11, (the 5$^{th}$ line, following the heading "Cross References to Related Applications"):
"No. 60/773,874" should be --No. 60/733,874--

Signed and Sealed this
Second Day of May, 2017

Michelle K. Lee
*Director of the United States Patent and Trademark Office*